(12) United States Patent
Kowase

(10) Patent No.: US 11,069,480 B2
(45) Date of Patent: Jul. 20, 2021

(54) MULTI-LAYER CERAMIC ELECTRONIC COMPONENT AND METHOD OF PRODUCING THE SAME

(71) Applicant: TAIYO YUDEN CO., LTD., Tokyo (JP)

(72) Inventor: Yusuke Kowase, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 16/598,837

(22) Filed: Oct. 10, 2019

(65) Prior Publication Data

US 2020/0135398 A1 Apr. 30, 2020

(30) Foreign Application Priority Data

Oct. 24, 2018 (JP) .............................. JP2018-199815

(51) Int. Cl.
*H01G 4/30* (2006.01)
*H01G 4/12* (2006.01)
*B32B 37/02* (2006.01)
*H01G 4/005* (2006.01)

(52) U.S. Cl.
CPC .......... *H01G 4/1245* (2013.01); *B32B 37/02* (2013.01); *H01G 4/005* (2013.01); *H01G 4/30* (2013.01)

(58) Field of Classification Search
None
See application file for complete search history.

(56) References Cited

U.S. PATENT DOCUMENTS

| 10,622,152 B2* | 4/2020 | Kogure .................. H01G 4/224 |
| 2012/0234462 A1 | 9/2012 | Matsui et al. |
| 2014/0345926 A1* | 11/2014 | Lee ........................ H05K 1/181 174/260 |
| 2015/0340155 A1* | 11/2015 | Fukunaga .............. H01G 4/012 361/301.4 |
| 2018/0019060 A1* | 1/2018 | Sugita ..................... H01G 4/232 |
| 2018/0090276 A1* | 3/2018 | Ito ........................... H01G 4/232 |
| 2018/0182555 A1* | 6/2018 | Kowase .................. H01G 4/224 |
| 2019/0198249 A1* | 6/2019 | Sato ........................ H01G 4/224 |
| 2019/0348222 A1* | 11/2019 | Kato ...................... H01G 4/1227 |
| 2020/0051740 A1* | 2/2020 | Park ........................ H01G 4/012 |

FOREIGN PATENT DOCUMENTS

JP 2012209539 A 10/2012

\* cited by examiner

*Primary Examiner* — Dion Ferguson
(74) *Attorney, Agent, or Firm* — Law Office of Katsuhiro Arai

(57) ABSTRACT

A multi-layer ceramic electronic component includes a multi-layer unit and a side margin. The multi-layer unit includes ceramic layers laminated in a direction of a first axis, internal electrodes positioned between the ceramic layers, and a side surface facing in a direction of a second axis orthogonal to the first axis, the internal electrodes being exposed from the side surface, the multi-layer unit having a first dimension of 0.5 mm or less along a direction of a third axis orthogonal to the first axis and the second axis, the side surface having an area of 0.1 mm² or more. The side margin covers the side surface of the multi-layer unit.

4 Claims, 9 Drawing Sheets

MULTI-LAYER CERAMIC ELECTRONIC COMPONENT AND METHOD OF PRODUCING THE SAME

CROSS REFERENCE TO RELATED APPLICATIONS

This application claims the benefit of Japanese Priority Patent Application JP 2018-199815 filed Oct. 24, 2018, the entire contents of which are incorporated herein by reference.

BACKGROUND

The present disclosure relates to a multi-layer ceramic electronic component including side margins provided in a later step, and a method of producing the multi-layer ceramic electronic component.

In the process of producing a multi-layer ceramic capacitor, a technique of providing side margins thereto in a later step is known (see, for example, Japanese Patent Application Laid-open No. 2012-209539). This technique is advantageous in terms of miniaturization and increase in capacitance of a multi-layer ceramic capacitor, because side surfaces of a multi-layer unit including internal electrodes exposed from the side surfaces can be reliably protected by also the thin side margins.

As an example, in the method of producing a multi-layer ceramic capacitor, which is disclosed in Japanese Patent Application Laid-open No. 2012-209539, a multi-layer sheet, which includes laminated ceramic sheets on which respective internal electrodes are printed, is cut to produce a plurality of multi-layer units. The multi-layer units each have side surfaces, i.e., cross sections from which internal electrodes are exposed. Subsequently, another ceramic sheet is punched by using the side surface of the multi-layer unit to thus form a side margin on the side surface of the multi-layer unit.

SUMMARY

In recent years, along with further miniaturization of electronic devices, there have also been demands for further miniaturization of multi-layer ceramic capacitors. In order to miniaturize the multi-layer ceramic capacitor, it is necessary to miniaturize the multi-layer unit. However, the miniaturization of the multi-layer unit makes it difficult to properly punch a ceramic sheet by using the side surface of the multi-layer unit.

In view of the circumstances as described above, it is desirable to provide a technique for punching a ceramic sheet by using a side surface of a multi-layer unit in a process of producing a small multi-layer ceramic electronic component.

According to an embodiment of the present disclosure, there is provided a multi-layer ceramic electronic component including a multi-layer unit and a side margin.

The multi-layer unit includes ceramic layers laminated in a direction of a first axis, internal electrodes positioned between the ceramic layers, and a side surface facing in a direction of a second axis orthogonal to the first axis, the internal electrodes being exposed from the side surface, the multi-layer unit having a first dimension of 0.5 mm or less along a direction of a third axis orthogonal to the first axis and the second axis, the side surface having an area of 0.1 $mm^2$ or more.

The side margin covers the side surface of the multi-layer unit.

Further, according to another embodiment of the present disclosure, there is provided a method of producing a multi-layer ceramic electronic component, the method including: preparing an unsintered multi-layer unit that includes ceramic layers laminated in a direction of a first axis, internal electrodes positioned between the ceramic layers, and a side surface facing in a direction of a second axis orthogonal to the first axis, the internal electrodes being exposed from the side surface, the unsintered multi-layer unit being to have a dimension of 0.5 mm or less along a direction of a third axis orthogonal to the first axis and the second axis after sintering, the side surface being to have an area of 0.1 $mm^2$ or more after sintering; and punching a ceramic sheet by using the side surface of the unsintered multi-layer unit.

In the configuration of the present disclosure, even if the first dimension of the multi-layer unit is reduced to 0.5 mm or less, high bonding strength of the side margin with respect to the multi-layer unit is obtained by ensuring the area of the side surface of the multi-layer unit in the size of 0.1 $mm^2$ or more.

The first dimension may be 0.75 times or more and 1.35 times or less a second dimension of the multi-layer unit along the direction of the first axis.

In this configuration, it is possible to apply a sufficient shear force to the ceramic sheet along the entire circumference of the outer edge of the side surface of the multi-layer unit. Therefore, it is possible to more properly punch the ceramic sheet by using the side surface of the multi-layer unit.

End portions of the internal electrodes in the direction of the second axis may be positioned within a range of 0.5 μm in the direction of the second axis.

Since this configuration can ensure a wide intersectional area of the internal electrodes, a multi-layer ceramic capacitor having a high capacitance is obtained.

As described above, according to the present disclosure, it is possible to provide a technique for punching a ceramic sheet by using a side surface of a multi-layer unit in a process of producing a small multi-layer ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The Z axis is an axis facing in the vertical direction. The X axis and the Y axis are axes facing in the horizontal direction orthogonal to the Z axis. The X axis, the Y axis, and the Z axis are common in all figures.

1. Configuration of Multi-Layer Ceramic Capacitor 10

Figure 1:
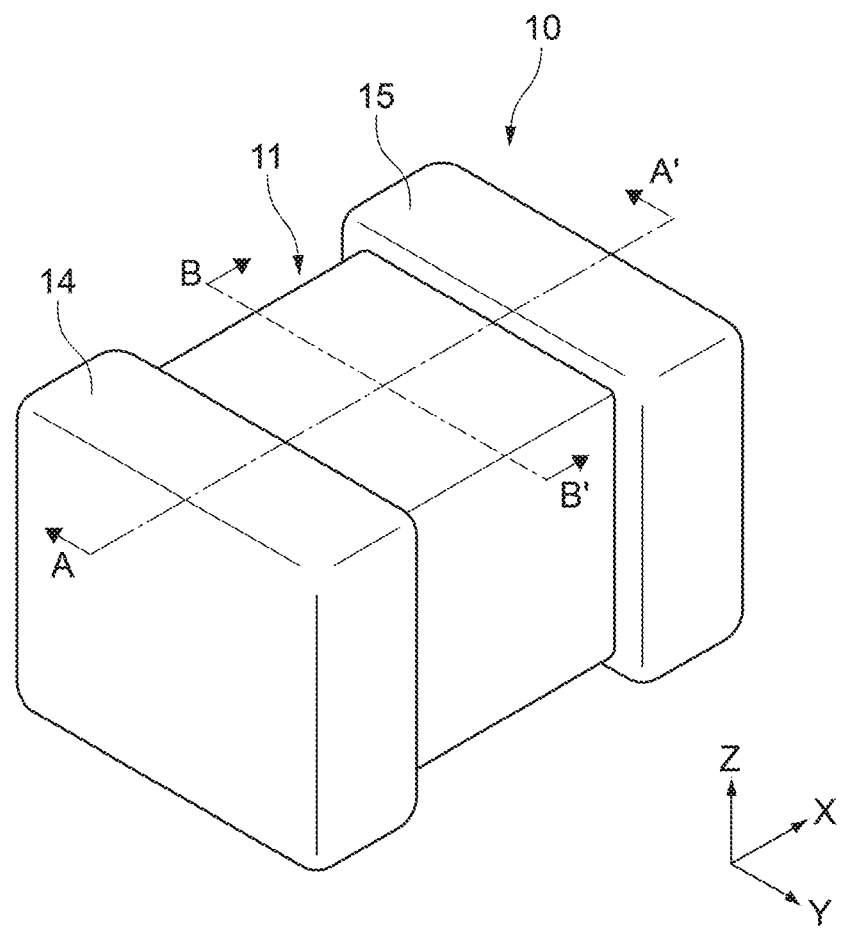
FIG. 1 is a perspective view of a multi-layer ceramic capacitor according to an embodiment of the present disclosure.
Figure 2:
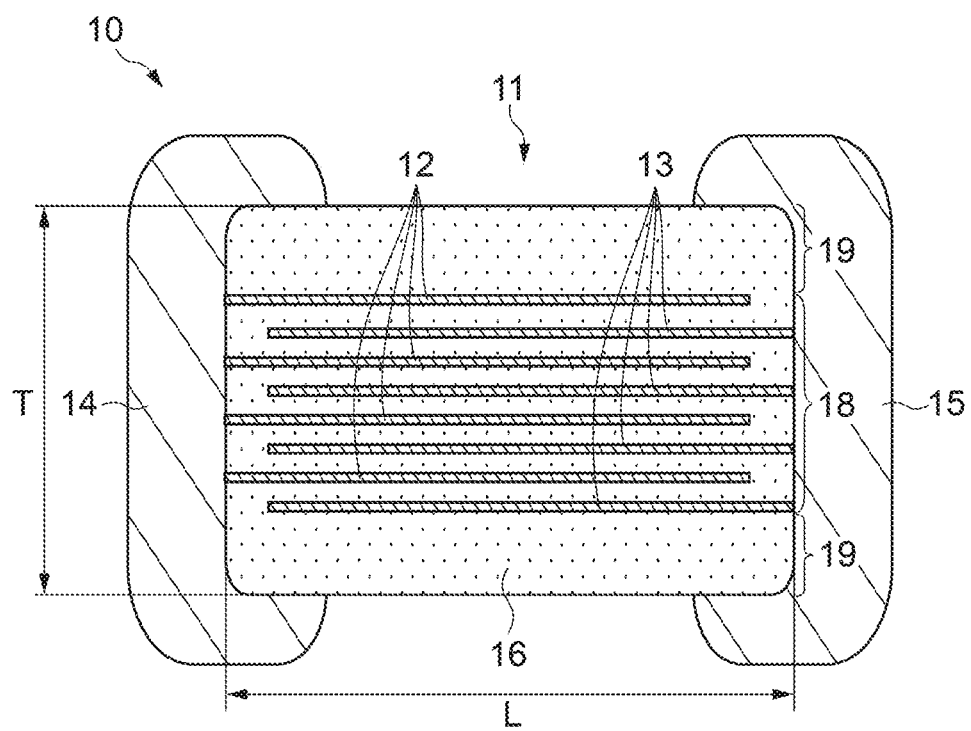
FIG. 2 is a cross-sectional view of the multi-layer ceramic capacitor taken along the A-A' line in FIG. 1.
Figure 3:
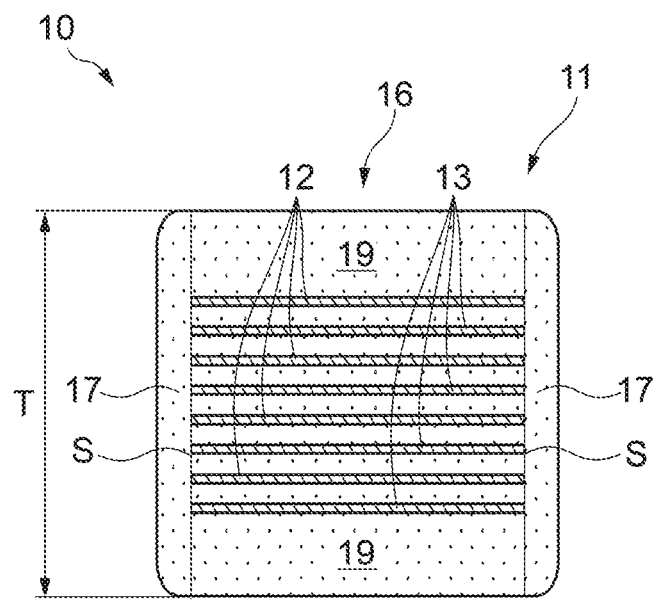
FIG. 3 is a cross-sectional view of the multi-layer ceramic capacitor taken along the B-B' line in FIG. 1.

FIGS. 1 to 3 each show a multi-layer ceramic capacitor 10 having a common posture according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

In the multi-layer ceramic capacitor 10, the X-axis direction corresponds to a length direction, the Y-axis direction corresponds to a width direction, and the Z-axis direction corresponds to a thickness direction at the posture shown in FIGS. 1 to 3. In the multi-layer ceramic capacitor 10, reducing the dimensions in the length direction and the width direction achieves reduction in mount area on an electronic device on which the multi-layer ceramic capacitor 10 is to be mounted.

The multi-layer ceramic capacitor 10 includes a ceramic body 11, a first external electrode 14, and a second external electrode 15. The ceramic body 11 is formed as a hexahedron having first and second end surfaces orthogonal to the X axis, first and second side surfaces orthogonal to the Y axis, and first and second main surfaces orthogonal to the Z axis.

The first external electrode 14 and the second external electrode 15 cover both the first and second end surfaces of the ceramic body 11 and face each other in the X-axis direction while sandwiching the ceramic body 11 therebetween. The first external electrode 14 and the second external electrode 15 extend to the first and second main surfaces and the first and second side surfaces from the first and second end surfaces of the ceramic body 11. With this configuration, the first external electrode 14 and the second external electrode 15 have U-shaped cross sections parallel to the X-Z plane and the X-Y plane.

It should be noted that the shapes of the first and second external electrodes 14 and 15 are not limited to those shown in FIGS. 1 and 2. For example, the first and second external electrodes 14 and 15 may extend to only one of the first and second main surfaces from both the first and second end surfaces of the ceramic body 11 and have L-shaped cross sections parallel to the X-Z plane. Further, the first and second external electrodes 14 and 15 do not need to extend to any of the main surfaces and the side surfaces.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The ceramic body 11 is formed of dielectric ceramics and includes a multi-layer unit 16 and side margins 17. The multi-layer unit 16 has a pair of side surfaces S that are orthogonal to the Y axis and face in the Y-axis direction. Further, the multi-layer unit 16 has a pair of end surfaces that are orthogonal to the X axis and facing in the X-axis direction, and a pair of main surfaces that are orthogonal to the Z axis and facing in the Z-axis direction.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 from above and below in the Z-axis direction to form the pair of main surfaces of the multi-layer unit 16.

The capacitance forming unit 18 includes a plurality of first internal electrodes 12 and a plurality of second internal electrodes 13 that are disposed between the ceramic layers. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to only the first external electrode 14, and the second internal electrodes 13 are connected to only the second external electrode 15.

The first and second internal electrodes 12 and 13 are formed over the entire width of the capacitance forming unit 18 in the Y-axis direction and are exposed from the pair of side surfaces S of the multi-layer unit 16. The side margins 17 cover the pair of side surfaces S of the multi-layer unit 16. This can ensure insulation properties between the first internal electrodes 12 and the second internal electrodes 13 on both the side surfaces S of the multi-layer unit 16.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. Accordingly, the multi-layer ceramic capacitor 10 stores charge corresponding to the voltage applied between the first external electrode 14 and the second external electrode 15.

In the ceramic body 11, in order to increase capacitances of the respective ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like or an alloy of them.

FIG. 2 shows a first dimension L along the X-axis direction and a second dimension T along the Z-axis direction of the multi-layer unit 16. In the multi-layer ceramic capacitor 10 according to this embodiment, the dimension L of the multi-layer unit 16 is set to 0.5 mm or less, and thus the whole dimension in the X-axis direction, which includes the first external electrode 14 and the second external electrode 15, is suppressed to be small.

Further, in the multi-layer unit 16, the surface shape of the side surface S can be considered to be equal to the cross section shown in FIG. 2. Thus, the outer edge of the side surface S of the multi-layer unit 16 has a rectangular outline including a pair of first sides each having the dimension L and a pair of second sides each having the dimension T. Therefore, the area of the side surface S of the multi-layer unit 16 can be calculated as a product (L*T) of the dimension L and the dimension T.

In the multi-layer ceramic capacitor 10 according to this embodiment, the dimension T of the multi-layer unit 16 is determined such that the area of the side surface S of the multi-layer unit 16 is 0.1 mm$^2$ or more. Accordingly, since a large bonding area of the multi-layer unit 16 and the side margin 17 is ensured, high bonding strength of the side margin 17 with respect to the multi-layer unit 16 is obtained.

2. Method of Producing Multi-Layer Ceramic Capacitor 10

Figure 4:
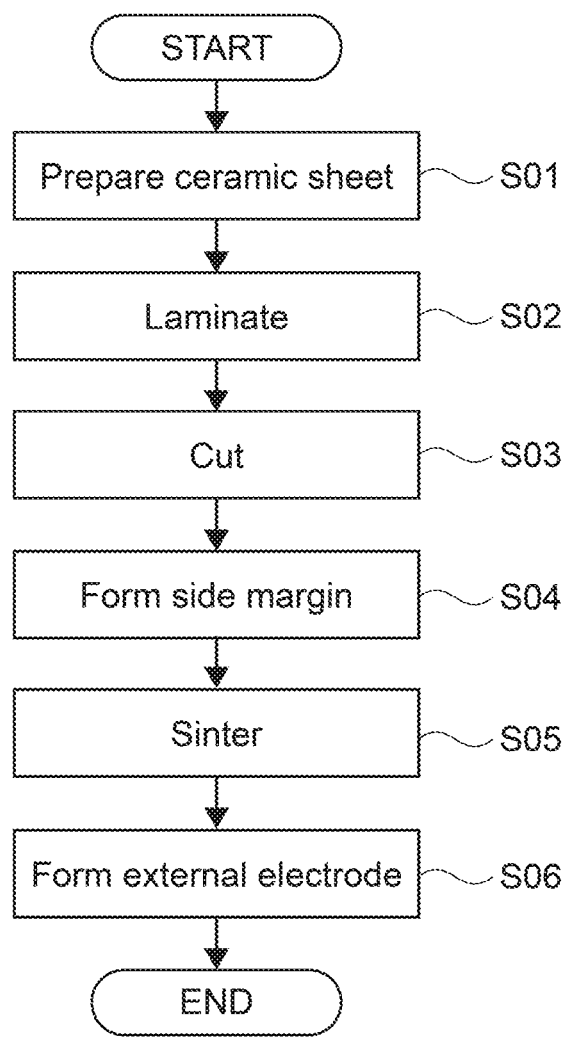
FIG. 4 is a flowchart showing a method of producing the multi-layer ceramic capacitor.
Figure 5:
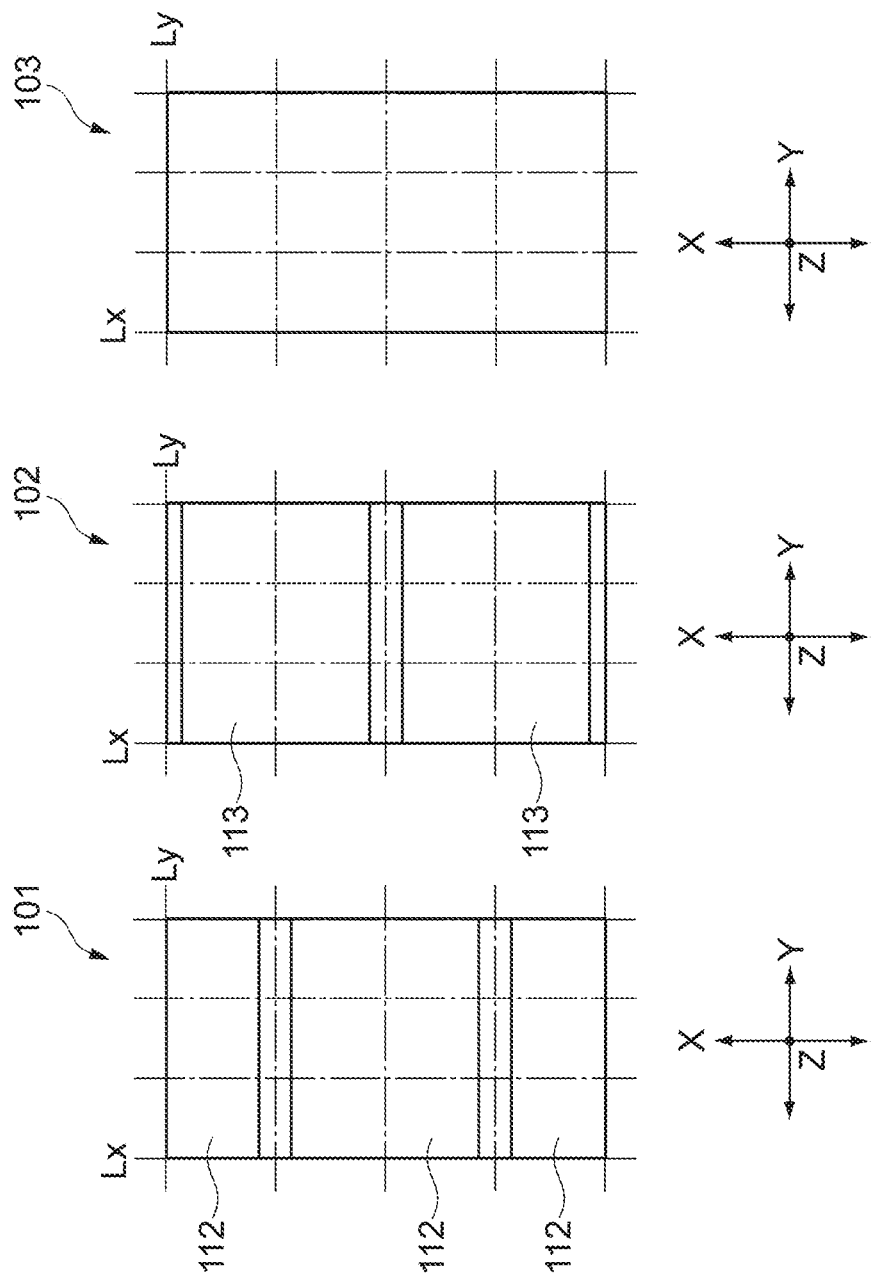
FIGS. 5A, 5B, and 5C are plan views of ceramic sheets, which are prepared in a process of preparing ceramic sheets of the production method described above.

FIG. 4 is a flowchart showing a method of producing the multi-layer ceramic capacitor 10 according to this embodiment. FIGS. 5A to 11 are views each showing a production process of the multi-layer ceramic capacitor 10. Hereinafter, the method of producing the multi-layer ceramic capacitor 10 will be described along FIG. 4 with reference to FIGS. 5A to 11 as appropriate.

2.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are configured as unsintered dielectric green sheets mainly containing dielectric ceramics.

The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layer of the sintered capacitance forming unit 18. The thickness of the third ceramic sheet 103 is adjustable as appropriate.

FIGS. 5A, 5B, and 5C are plan views of the first, second, and third ceramic sheets 101, 102, and 103, respectively. At this stage, the first, second, and third ceramic sheets 101, 102, and 103 are each configured as a large-sized sheet that is not singulated. FIGS. 5A, 5B, and 5C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. A method of applying the electrically conductive paste is optionally selectable from publicly known techniques. For example, for the application of the electrically conductive paste, a screen printing method or a gravure printing method can be used.

In the first and second internal electrodes 112 and 113, gaps are formed in the X-axis direction along the cutting lines Ly for every other cutting line Ly. The gaps between the first internal electrodes 112 and the gaps between the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

2.2 Step S02: Lamination

Figure 6:
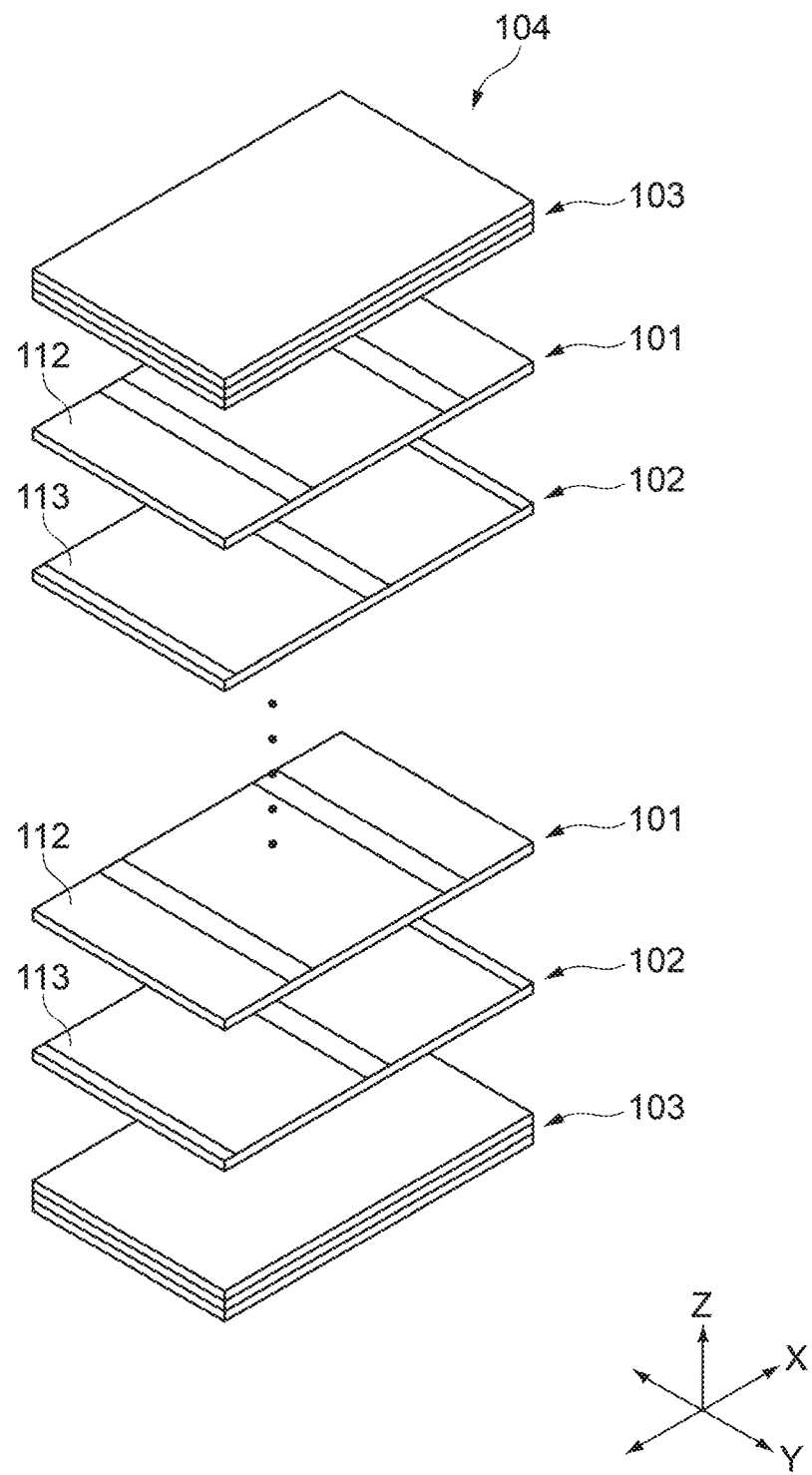
FIG. 6 is a perspective view showing a lamination process of the production method described above.

In Step S02, the first, second, and third ceramic sheets 101, 102, and 103 prepared in Step S01 are laminated as shown in FIG. 6, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the upper and lower surfaces of the alternately laminated first and second ceramic sheets 101 and 102 in the Z-axis direction. It should be noted that in the example shown in FIG. 6 three third ceramic sheets 103 are laminated on each of the upper and lower surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.3 Step S03: Cutting

In Step S03, the multi-layer sheet 104 obtained in Step S02 is cut along the cutting lines Lx and Ly, to produce unsintered multi-layer units 116. Each of the multi-layer units 116 corresponds to a multi-layer unit 16 to be obtained after sintering. The multi-layer sheet 104 can be cut with a push-cutting blade, a rotary blade, or the like.

Figure 7:
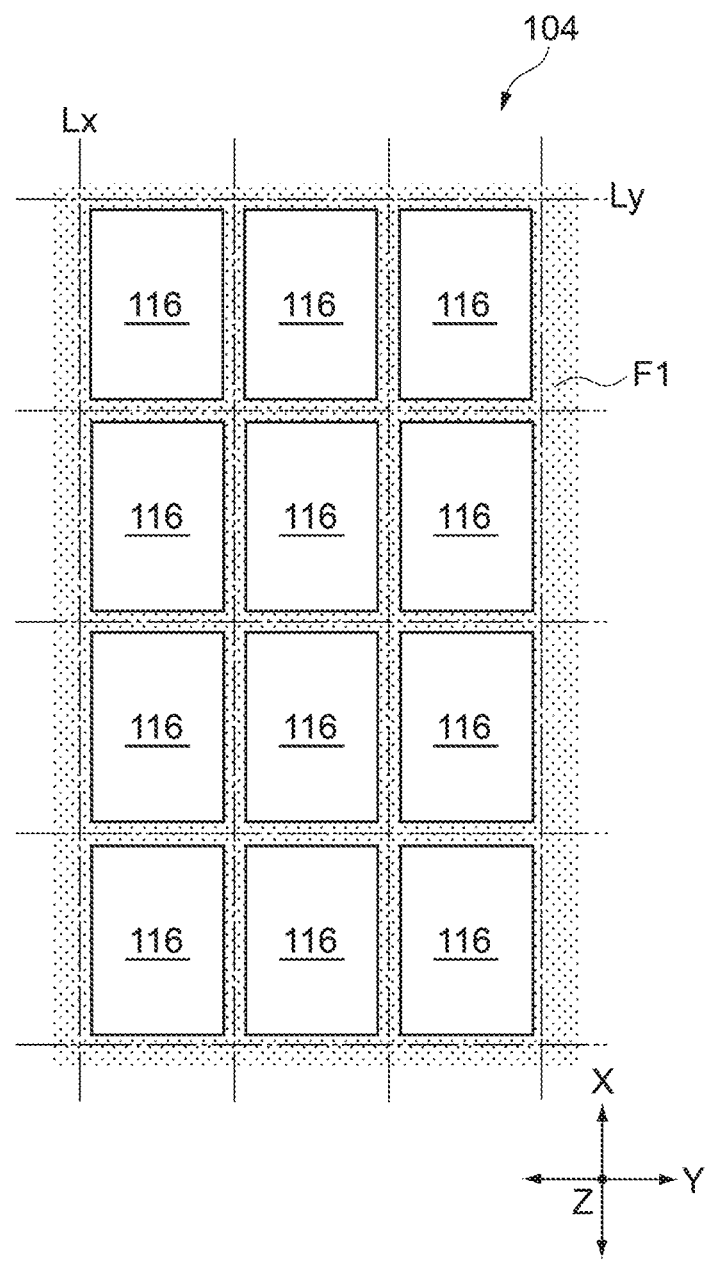
FIG. 7 is a plan view showing a cutting process of the production method described above.
Figure 8A:
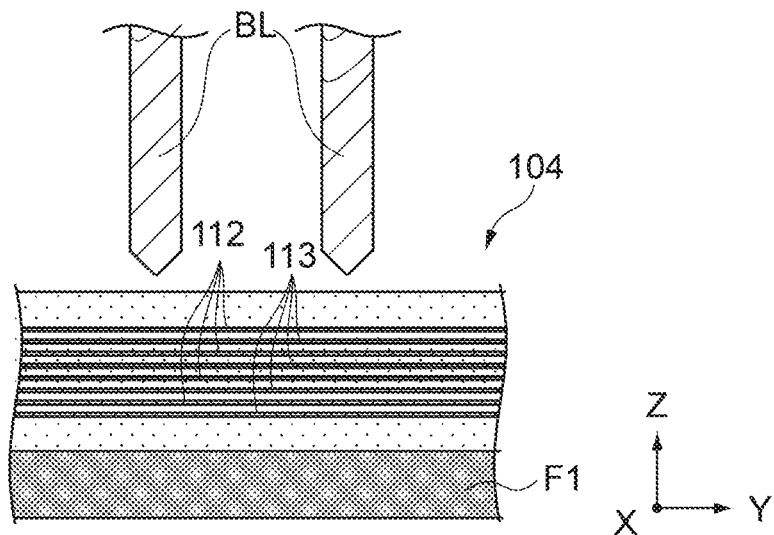
FIGS. 8A, 8B, and 8C are partial cross-sectional views each showing the cutting process.
Figure 8B:
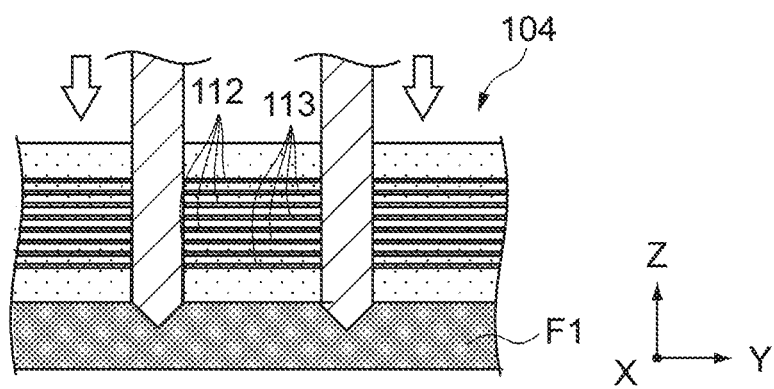
Figure 8C:
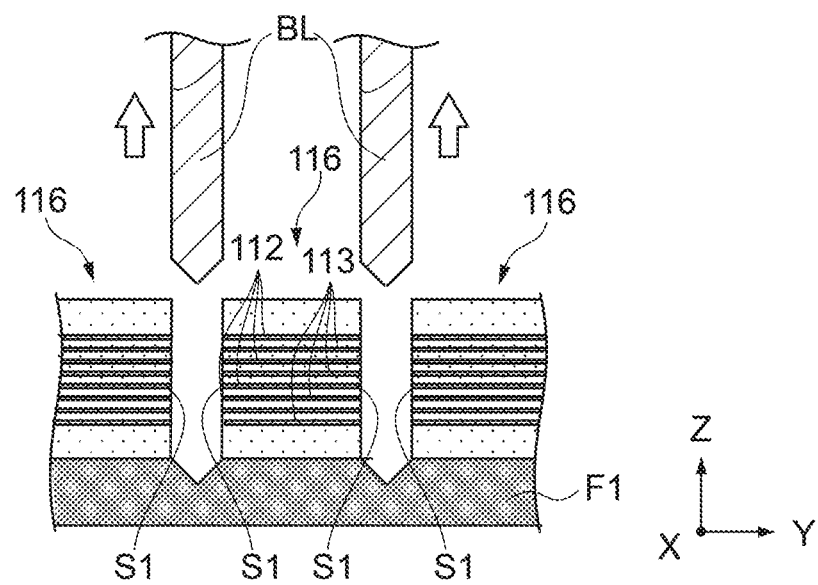

FIGS. 7, 8A, 8B, and 8C are schematic views for describing an example of Step S03. FIG. 7 is a plan view of the multi-layer sheet 104. FIGS. 8A, 8B, and 8C are cross-sectional views of the multi-layer sheet 104 along the Y-Z plane. The multi-layer sheet 104 is cut with a push-cutting blade BL along the cutting lines Lx and Ly while the multi-layer sheet 104 is held by an adhesive sheet F1 such as a foamed release sheet.

First, as shown in FIG. 8A, the push-cutting blade BL is disposed on the upper side of the multi-layer sheet 104 in the Z-axis direction, with the tip of the push-cutting blade BL facing the multi-layer sheet 104 downward in the Z-axis direction. Next, as shown in FIG. 8B, the push-cutting blade BL is moved downward in the Z-axis direction until the push-cutting blade BL reaches the adhesive sheet F1, to penetrate the multi-layer sheet 104.

Subsequently, as shown in FIG. 8C, the push-cutting blade BL is moved upward in the Z-axis direction and thus pulled out of the multi-layer sheet 104. Accordingly, the multi-layer sheet 104 is cut in the X- and Y-axis directions, and unsintered multi-layer units 116 each having side surfaces S1 are formed. The first internal electrodes 112 and the second internal electrodes 113 are exposed from the side surfaces S1 in the Y-axis direction.

2.4 Step S04: Formation of Side Margin

Figure 9A:
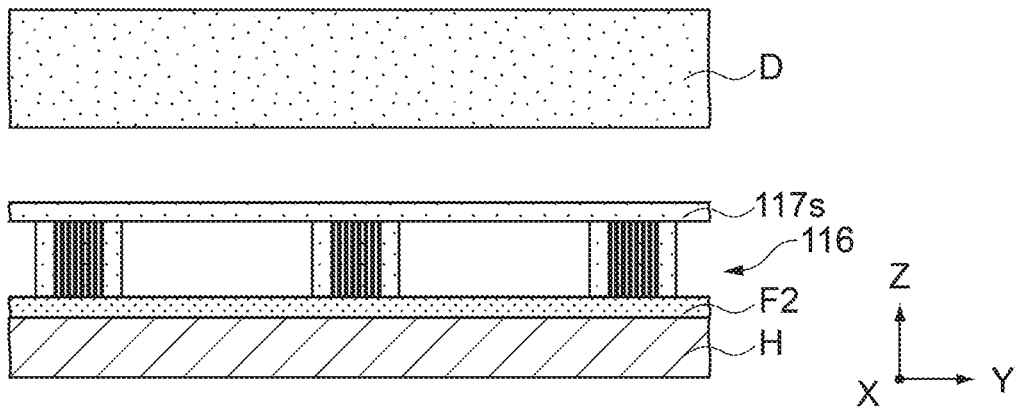
FIGS. 9A, 9B, and 9C are partial cross-sectional views each showing a process of forming side margins of the production method described above.
Figure 9B:
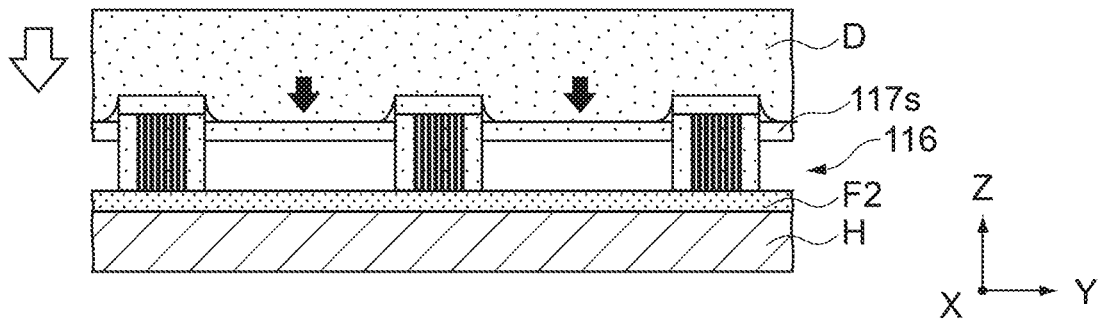
Figure 9C:
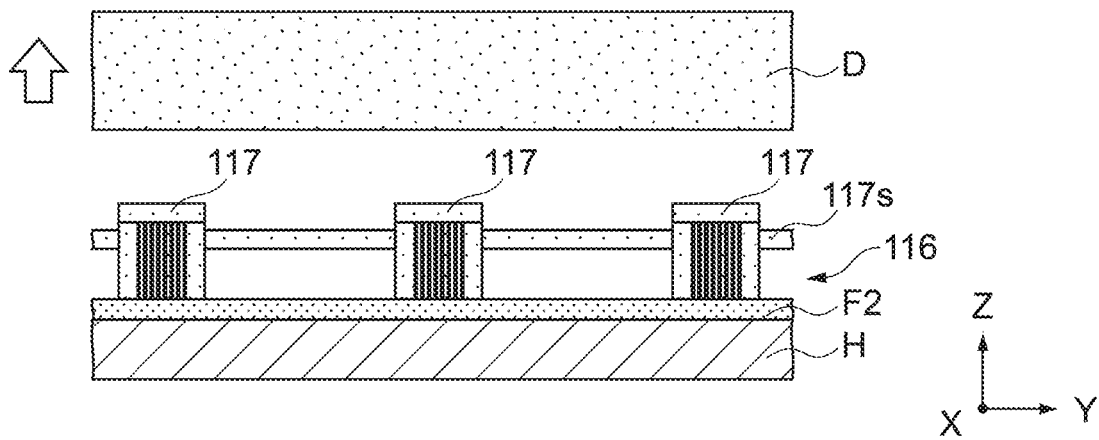

In Step S04, unsintered side margins 117 are provided to both the side surfaces S1 of the multi-layer unit 116 obtained in Step S03. In Step S04, a ceramic sheet 117s is punched by the side surfaces S1 of the multi-layer units 116 to form the side margins 117. FIGS. 9A, 9B, and 9C are views showing the process of Step S04.

In the state immediately after Step S03 shown in FIG. 8C, the directions of the side surfaces S1 of the multi-layer units 116 are not aligned with one another, and it is difficult to punch the ceramic sheet 117s in a lump by using the side surfaces S1 of the multi-layer units 116. Thus, in Step S04, first, the directions of the multi-layer units 116 are changed such that the directions of the side surfaces S1 of the multi-layer units 116 uniformly face in the Z-axis direction.

In order to change the directions of the multi-layer units 116, for example, the adhesive sheet F1 is replaced with an adhesive sheet F2 and thus the multi-layer units 116 are attached to the adhesive sheet F2. Thus, the multi-layer units 116 can be rotated by 90 degrees in a lump onto the adhesive sheet F2. Accordingly, in any of the plurality of multi-layer units 116, one side surface S1 is held by the adhesive sheet F2, and the other side surface S1 faces upward in the Z-axis direction.

It should be noted that the adhesive sheet F2 favorably has extensibility. Accordingly, the intervals between the multi-layer units 116 in the Y-axis direction can be widened in advance by extending the adhesive sheet F2 before the multi-layer units 116 are rotated onto the adhesive sheet F2. This enables the multi-layer units 116 to be smoothly rotated.

After the directions of the multi-layer units 116 are changed, as shown in FIG. 9A, a series of ceramic sheets 117s is disposed on the side surfaces S1 of the multi-layer units 116, which face upward in the Z-axis direction, with the lower surface of the adhesive sheet F2 in the Z-axis direction being held by a holding plate H. Accordingly, the ceramic sheet 117s faces the adhesive sheet F2 while the multi-layer units 116 are sandwiched therebetween.

Subsequently, a plate-like elastic member D extending along the X-Y plane is disposed so as to face the ceramic sheet 117s, which is disposed on the multi-layer units 116, upward in the Z-axis direction. The elastic member D to be used in Step S04 favorably has low elasticity and can be formed of, for example, rubber having low elasticity.

Next, as shown in FIG. 9B, the elastic member D is moved downward in the Z-axis direction until it comes into contact with the ceramic sheet 117s, and the multi-layer units 116 and the ceramic sheet 117s are sandwiched between the adhesive sheet F2 held by the holding plate H and the elastic member D. Subsequently, the ceramic sheet 117s is pushed downward in the Z-axis direction by the elastic member D.

In this case, the elastic member D bites into spaces formed between the multi-layer units 116 and pushes regions of the ceramic sheet 117s down in the Z-axis direction, the regions being not held by the side surfaces S1 of the multi-layer units 116. Accordingly, the ceramic sheet 117s is cut by a shear force applied in the Z-axis direction along the outer edge of the side surface S1 of each multi-layer unit 116.

Figure 10:
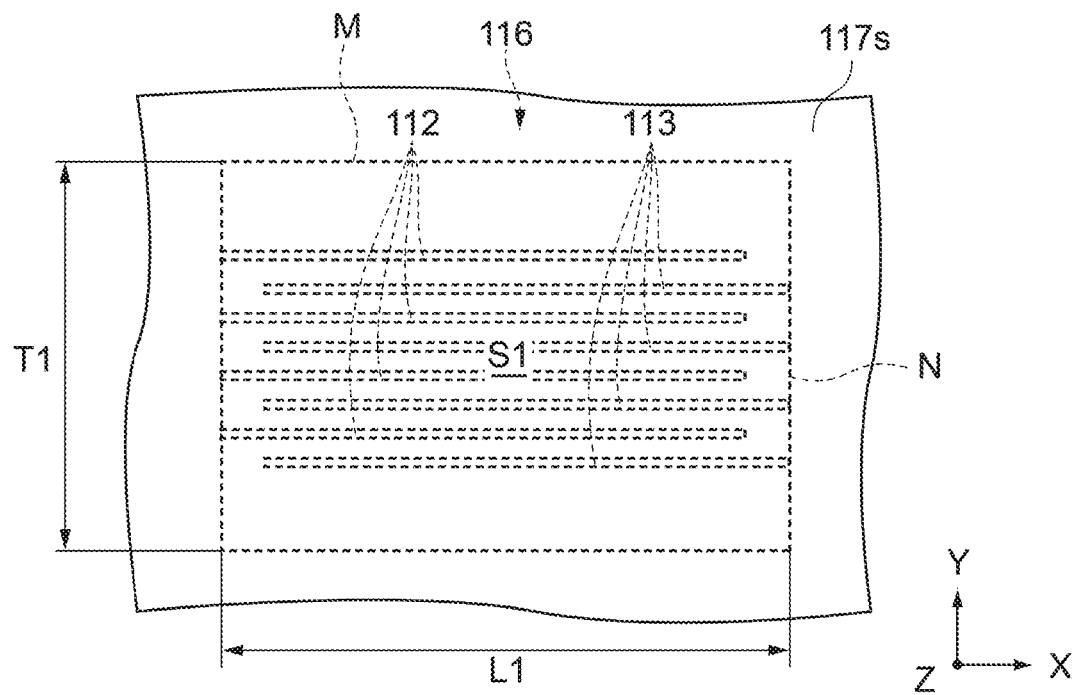
FIG. 10 is a plan view showing the process of forming side margins.

FIG. 10 is a plan view of the ceramic sheet 117s seen from above in the Z-axis direction. FIG. 10 shows the multi-layer unit 116, which is disposed on the lower side of the ceramic sheet 117s in the Z-axis direction, by using broken lines. The outer edge of the side surface S1 of the multi-layer unit 116 has a rectangular outline including a pair of first sides M each having a dimension L1 and a pair of second sides N each having a dimension T1.

As described above, since the dimension L of the sintered multi-layer unit 16 has to be set to 0.5 mm or less in the multi-layer ceramic capacitor 10, the dimension L1 of the multi-layer unit 116 at the unsintered stage also has to be suppressed to be small. Therefore, in the side surface S1 of the multi-layer unit 116, which is a surface for punching the ceramic sheet 117s, the dimension L1 of the first side M of the outer edge is made small.

As described above, the side surface S1 of the multi-layer unit 116, in which the dimension L1 of the first side M of the outer edge is small, has a small contact area with the ceramic sheet 117s, and thus bonding strength of the side margin 117 is liable to be insufficient. To the contrary, in the multi-layer unit 116 according to this embodiment, the dimension T1 is determined so as to ensure a certain size of the area of the side surface S1.

Specifically, the dimension T1 of the unsintered multi-layer unit 116 is determined on the basis of the dimension T, with which an area (L*T) of the side surface S of the sintered multi-layer unit 16 is 0.1 mm$^2$ or more. Accordingly, in the multi-layer unit 116, the contact area of the side surface S1 and the ceramic sheet 117s is ensured, and thus the side margin 117 having high bonding strength is obtained.

Further, in order to punch the ceramic sheet 117s by using the side surface S1 of the multi-layer unit 116, it is necessary to seamlessly cut the ceramic sheet 117s along the entire circumference of the outer edge of the side surface S1 of the multi-layer unit 116. In other words, it is necessary to apply a shear force enough to cut the ceramic sheet 117s along the entire circumference of the outer edge of the side surface S1 of the multi-layer unit 116.

Under normal circumstances, a shear force to be applied from the outer edge of the side surface S1 of the multi-layer unit 116 to the ceramic sheet 117s is likely to be concentrated in the short sides (in FIG. 10, the second sides N) and is likely to be insufficient in the long sides (in FIG. 10, the first sides M) among the first sides M and the second sides N. More specifically, at the outer edge of the side surface S1 of the multi-layer unit 116, a shear force is likely to be insufficient particularly at the center of each long side.

At the outer edge of the side surface S1 of the multi-layer unit 116, as the shape of the outline becomes flatter, a shear force to be applied to the ceramic sheet 117s becomes more biased. In other words, at the outer edge of the side surface S1 of the multi-layer unit 116, as the shape of the outline becomes closer to a square, a uniform shear force is more likely to be applied to the ceramic sheet 117s along the entire circumference of the outer edge.

Therefore, it is favorable that the side surface S1 of the multi-layer unit 116 has a small difference between the dimension L1 of the first side M and the dimension T1 of the second side N. Specifically, in the side surface S1 of the multi-layer unit 116, it is favorable to design the dimension L1 of the first side M and the dimension T1 of the second side N such that the dimension L of the sintered multi-layer unit 16 is 0.75 times or more and 1.35 times or less the dimension T.

Subsequently, as shown in FIG. 9C, the elastic member D is moved upward in the Z-axis direction and thus separated from the ceramic sheet 117s. In this case, the ceramic sheet 117s left on the side surface S1 of each multi-layer unit 116 is the side margin 117. The ceramic sheet 117s left in the space between the multi-layer units 116 is removed.

Subsequently, the adhesive sheet F2 is replaced with an adhesive sheet F3 and thus the multi-layer units 116 are attached to the adhesive sheet F3. The side margins 117 are held by the adhesive sheet F3. The side surfaces S1 of the multi-layer units 116 on the other side are turned upward in the Z-axis direction. Subsequently, in the manner similar to the above, the side margins 117 are formed also on the side surfaces S1 of the multi-layer units 116 on the other side.

Figure 11:
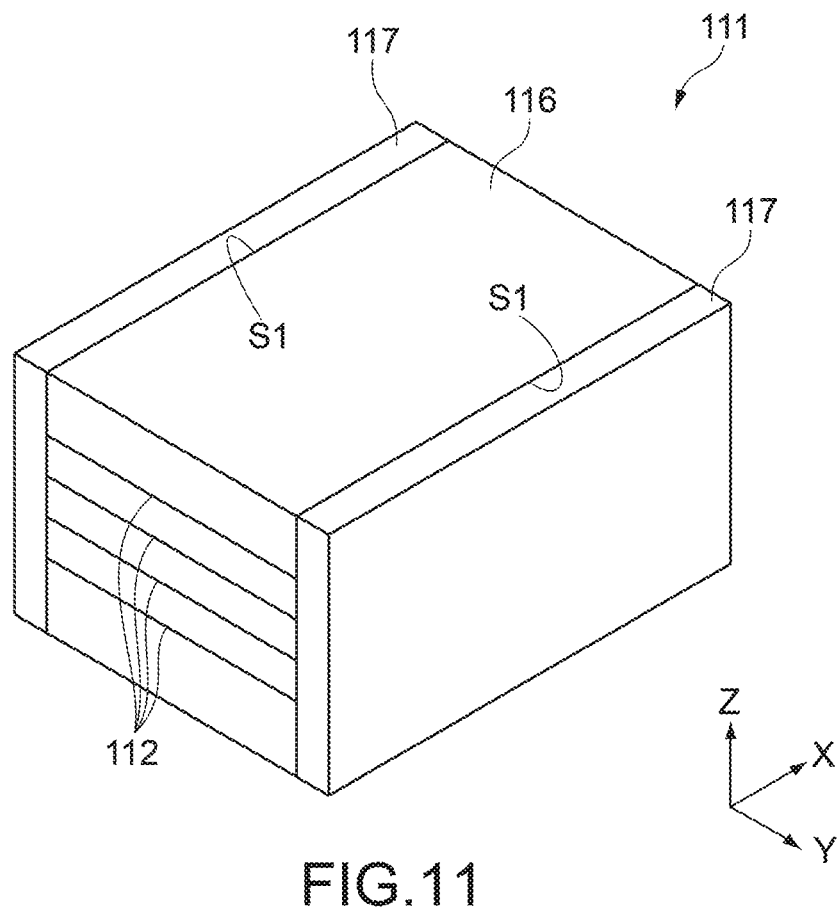
FIG. 11 is a perspective view of an unsintered ceramic body obtained in the process of forming side margins.

Accordingly, as shown in FIG. 11, an unsintered ceramic body 111 is obtained, in which the first and second internal electrodes 112 and 113 are exposed from the side surfaces S1 of the multi-layer unit 116 and the side surfaces S1 are covered with the side margins 117. In the ceramic body 111 according to this embodiment, the peeling of the side margins 117 due to a punching defect is less likely to occur.

2.5 Step S05: Sintering

In Step S05, the ceramic body 111 obtained in Step S04 is sintered, to produce the ceramic body 11 of the multi-layer ceramic capacitor 10 shown in FIGS. 1 to 3. In other words, through Step S05, the multi-layer unit 116 becomes the multi-layer unit 16, and the side margins 117 become the side margins 17.

A sintering temperature in Step S05 can be determined on the basis of a sintering temperature for the ceramic body 111. For example, if a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

2.6 Step S06: Formation of External Electrode

In Step S06, the first external electrode 14 and the second external electrode 15 are formed on both the end portions of the ceramic body 11 in the X-axis direction obtained in Step S05, to produce the multi-layer ceramic capacitor 10 shown in FIGS. 1 to 3. A method of forming the first external electrode 14 and the second external electrode 15 in Step S06 is optionally selectable from publicly known methods.

By the above steps, the multi-layer ceramic capacitor 10 is completed. In this production method, the side margins 117 are formed on the side surfaces S1, from which the first and second internal electrodes 112 and 113 are exposed, of the multi-layer unit 116. Thus, in the ceramic body 11, the end portions of the first and second internal electrodes 12 and 13 in the Y-axis direction are aligned with one another on the side surfaces S along the Z-axis direction and are positioned within the range of 0.5 μm in the Y-axis direction. This enables a wide intersectional area of the first and second internal electrodes 12 and 13 to be ensured, and a multi-layer ceramic capacitor 10 having a high capacitance can thus be obtained.

3. Examples and Comparative Example 100 samples of the multi-layer unit 116 were produced for each of Examples 1 to 5 and Comparative example of the embodiment described above under such conditions that multi-layer units 16 each having a different dimension L and a different dimension T are obtained after sintering. In the samples according to Examples 1 to 5 and Comparative example, conditions other than the dimension L and the dimension T of the multi-layer unit 16 obtained after sintering were set to be common.

Subsequently, the ceramic sheet 117s was punched by the side surface S1 of each sample to form the side margin 117 on the side surface S1 of each sample. In Examples 1 to 5 and Comparative example, a common ceramic sheet 117s was used. Subsequently, the presence/absence of the occurrence of peeling of the side margins 117 was evaluated for each sample by visual observation.

Table 1 below shows the number of samples in which the occurrence of peeling of the side margins 117 was recognized among 100 samples, as the evaluation results of each of Examples 1 to 5 and Comparative example. Further, Table 1 shows the dimension L, the dimension T, and the area of the side surface S of the multi-layer unit 16 to be obtained after sintering, for each of Examples 1 to 5 and Comparative example.

TABLE 1

|  | First dimension L (mm) | Second dimension T (mm) | Area ($mm^2$) | L / T | Occurrence of peeling |
|---|---|---|---|---|---|
| Comparative example | 0.4 | 0.2 | 0.08 | 2.00 | 28/100 |
| Example 1 | 0.3 | 0.35 | 0.11 | 0.86 | 7/100 |
| Example 2 | 0.3 | 0.4 | 0.12 | 0.75 | 5/100 |
| Example 3 | 0.4 | 0.3 | 0.12 | 1.33 | 6/100 |
| Example 4 | 0.4 | 0.35 | 0.14 | 1.14 | 4/100 |
| Example 5 | 0.4 | 0.4 | 0.16 | 1.00 | 2/100 |

As shown in Table 1, in Comparative example in which the area of the side surface S is less than 0.1 $mm^2$, the occurrence of peeling of the side margin 117 was recognized in 28 samples. This may be because the samples according to Comparative example had an extremely small contact area of the multi-layer unit 116 and the side margin 117 and had insufficient bonding strength of the side margin 117 with respect to the multi-layer unit 116.

Further, in the samples according to Comparative example, the rate (L/T) of the first dimension L to the second dimension T is large, that is, the outline shape of the outer edge of the side surface S1 is flat. Thus, it is conceived that there were samples in which a shear force applied to the ceramic sheet 117s from the outer edge of the multi-layer unit 116 was concentrated in the second sides N and was insufficient in the first sides M.

Meanwhile, in any of Examples 1 to 5 in which the area of the side surface S is 0.1 $mm^2$ or more, the number of samples in which the occurrence of peeling of the side margin 117 was recognized was 7 or less. Accordingly, it was confirmed that, also in the configuration having the dimension L of 0.5 mm or less, a punching defect of the ceramic sheet 117s is less likely to occur if the area of the side surface S is set to 0.1 $mm^2$ or more.

4. Other Embodiments

While the embodiment of the present disclosure has been described, the present disclosure is not limited to the embodiment described above, and it should be appreciated that the present disclosure may be variously modified.

For example, in the embodiment described above, the method of producing the multi-layer ceramic capacitor 10 has been described as an example of a multi-layer ceramic electronic component, but the method of producing the multi-layer ceramic capacitor 10 according to the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component comprising:
    a multi-layer unit that includes:
        ceramic layers laminated in a direction of a first axis, and
        internal electrodes positioned between the ceramic layers, respectively, and alternately exposed on different end surfaces of the multi-layer unit opposing each other in a direction of a third axis orthogonal to the first axis, wherein the internal electrodes are also exposed on side surfaces of the multi-layer unit opposing each other in a direction of a second axis orthogonal to the first axis and the third axis, wherein the side surfaces of the multi-layer unit each have a first dimension of 0.5 mm or less along the direction of the third axis and an area of 0.1 mm² or more; and
    side margins that cover the side surfaces of the multi-layer unit, respectively.

2. The multi-layer ceramic electronic component according to claim 1, wherein
    the first dimension is 0.75 times or more and 1.35 times or less a second dimension of the multi-layer unit along the direction of the first axis.

3. The multi-layer ceramic electronic component according to claim 1, wherein
    end portions of the internal electrodes in the direction of the second axis are positioned within a range of 0.5 µm in the direction of the second axis.

4. A method of producing a multi-layer ceramic electronic component, comprising:
    preparing an unsintered multi-layer unit that includes:
        ceramic layers laminated in a direction of a first axis, and
        internal electrodes positioned between the ceramic layers, respectively, and alternately exposed on different end surfaces of the multi-layer unit opposing each other in a direction of a third axis orthogonal to the first axis, wherein the internal electrodes are also exposed on side surfaces of the multi-layer unit opposing each other in a direction of a second axis orthogonal to the first axis and the third axis,
        wherein the side surfaces of the unsintered multi-layer unit are made to have a dimension of 0.5 mm or less along the direction of the third axis after sintering, and an area of 0.1 mm² or more after sintering;
    punching an unsintered ceramic sheet by using one of the side surfaces of the unsintered multi-layer unit to form an unsintered side margin on the one of the side surfaces using the unsintered ceramic sheet;
    punching an unsintered ceramic sheet by using another of the side surfaces of the unsintered multi-layer unit to form an unsintered side margin on the another of the side surfaces using the unsintered ceramic sheet; and
    sintering the unsintered multilayer unit with the unsintered side margins.

* * * * *